US012694131B1

(12) United States Patent　　　　(10) Patent No.:　　US 12,694,131 B1
Wickett et al.　　　　　　　　　　　(45) Date of Patent:　　***Jul. 28, 2026

(54) COMPREHENSIVE SUITE FOR ADVANCED REAL-TIME CODE ANALYSIS AND SECURITY

(71) Applicant: DryRun Security Co., Austin, TX (US)

(72) Inventors: James Wickett, Round Rock, TX (US); Kenny Russell Johnson, Gainesville, VA (US)

(73) Assignee: DryRun Security Co., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/423,841

(22) Filed: Dec. 17, 2025

Related U.S. Application Data

(63) Continuation of application No. 19/054,721, filed on Feb. 14, 2025.

(51) Int. Cl.
*G06F 21/57*　　　(2013.01)
*G06F 21/54*　　　(2013.01)
*G06F 21/55*　　　(2013.01)

(52) U.S. Cl.
CPC ............ *G06F 21/577* (2013.01); *G06F 21/54* (2013.01); *G06F 21/552* (2013.01)

(58) Field of Classification Search
CPC ....... G06F 21/577; G06F 21/54; G06F 21/552
See application file for complete search history.

(56) References Cited

U.S. PATENT DOCUMENTS

2019/0347424 A1 * 11/2019 Bezzi ..................... G06F 21/577
2026/0030361 A1 * 1/2026 van Buul .............. G06F 21/577

* cited by examiner

*Primary Examiner* — Huan V Doan
(74) *Attorney, Agent, or Firm* — Perkins Coie LLP

(57) ABSTRACT

The disclosed technology pertains to the detection of security vulnerabilities in proposed changes to a codebase. Upon receiving a proposed change, the system determines a code context based on the data and metadata of the changed files. The proposed change is then divided into code segments processed by multiple code analyzers in parallel, each focusing on specific security concerns. The system can utilize large language models (LLMs) to enhance the analysis, providing more accurate and comprehensive detection of vulnerabilities. Furthermore, the system can present to a user a user interface comprising security information and answers to one or more natural-language security questions.

22 Claims, 13 Drawing Sheets

_300

```
diff -git a/README.md b/README.md
index 888c500..f0093e3 100644
--- a/README.md
+++ b/README.md
@@ -1,2 +1,3 @@
# Web Project
-This is the group website.
+This is the company homepage.
+
diff --git a/main.py b/main.py
index 777a123..e119a0b 100644
--- a/main.py
+++ b/main.py
@@ -10,3 +10,7 @@ def greet(name):
print (f"Hello, {name}!")

+def new_feature():
+ print("This is a new feature!")
+
+
if_name_ == "_main_":
greet("World")
```

Receive a proposed change to a codebase

904

Receive a code context for the proposed change

906

Split the proposed change into a set of code segments

908

Provide prompts to one or more LLMs

910

Supply assistance data for the set of code segments

912

Determine if a security vulnerability exists

COMPREHENSIVE SUITE FOR ADVANCED REAL-TIME CODE ANALYSIS AND SECURITY

CROSS-REFERENCE TO RELATED APPLICATIONS

This application is a continuation of U.S. patent application Ser. No. 19/054,721, filed on Feb. 14, 2025, entitled COMPREHENSIVE SUITE FOR ADVANCED REAL-TIME CODE ANALYSIS AND SECURITY, which is hereby incorporated by reference in its entirety.

TECHNICAL FIELD

This patent document is directed to using large language models to provide deterministic predictions for software application development, and more specifically, providing security vulnerability assessment of proposed code changes.

BACKGROUND

Application security is a field focused on identifying and mitigating vulnerabilities in software applications. This involves analyzing source code, application behaviors, and runtime configurations to detect potential security weaknesses. Application security practices can be integrated throughout the software development lifecycle, from initial design to deployment. These practices can include code reviews, static analysis, and dynamic testing during development and pre-release phases. Developers can use secure coding standards and analysis tools to identify issues like buffer overflows, input validation flaws, and insecure configurations early in the development process. As codebases grow more complex, application security approaches continue to evolve to address emerging threats and changing development methodologies.

SUMMARY

This patent document describes, among other things, techniques related to detecting security vulnerabilities in proposed changes to a codebase. In some aspects, the techniques can involve analyzing code contexts, splitting proposed changes into code segments, and using multiple code analyzers in parallel to identify potential security issues. In some implementations, a development architecture leveraging large language models (LLMs) can be used to provide deterministic predictions that facilitate software development, such as determining code contexts and/or detecting security vulnerabilities. Additionally, user interfaces for presenting security analysis results and summaries are described.

In one example, a system receives a proposed change for a codebase, where the proposed change includes one or more changes to files in the codebase. The system determines a code context for the proposed change based on factors like file types and programming languages used. This code context corresponds to an application type, which is associated with known security vulnerabilities. Multiple code analyzers then split the proposed change into sets of code segments based on the code context, with each analyzer configured to examine a specific aspect of security concerns. The analyzers process their corresponding code segments in parallel to detect if any security vulnerabilities exist in the proposed change.

In another example, a method involves receiving a proposed change for a codebase and determining a code context that corresponds to potential security vulnerabilities. Code analyzers then generate code segments containing text from the proposed change, with each analyzer creating segments relevant to its security focus. The method then detects security vulnerabilities by having the analyzers examine their respective code segments in parallel. The code context can be based on application type, which is determined from factors like file types, programming languages, code dependencies, or characteristics of the user making the changes. The code analyzers can process a natural-language security question as part of the process of detecting a security vulnerability.

In yet another example, a system identifies a set of security analysis reports, where each report corresponds to a security analysis performed on a proposed codebase change. The analyses can include output from code analyzers, which are used to detect potential vulnerabilities. The system presents a user interface on a device, displaying a list of change requests associated with proposed changes to one or more codebases. The interface also shows a detailed view of a selected change request, containing information from a security analysis summary corresponding to a security analysis report. The user interface can include displaying change requests for different codebases and providing filtering options for high-risk changes.

BRIEF DESCRIPTION OF THE DRAWINGS

Detailed descriptions of implementations of the present invention will be described and explained through the use of the accompanying drawings.

FIG. 3 is a diagram illustrating a format for a proposed change to a codebase.

Figure 1:
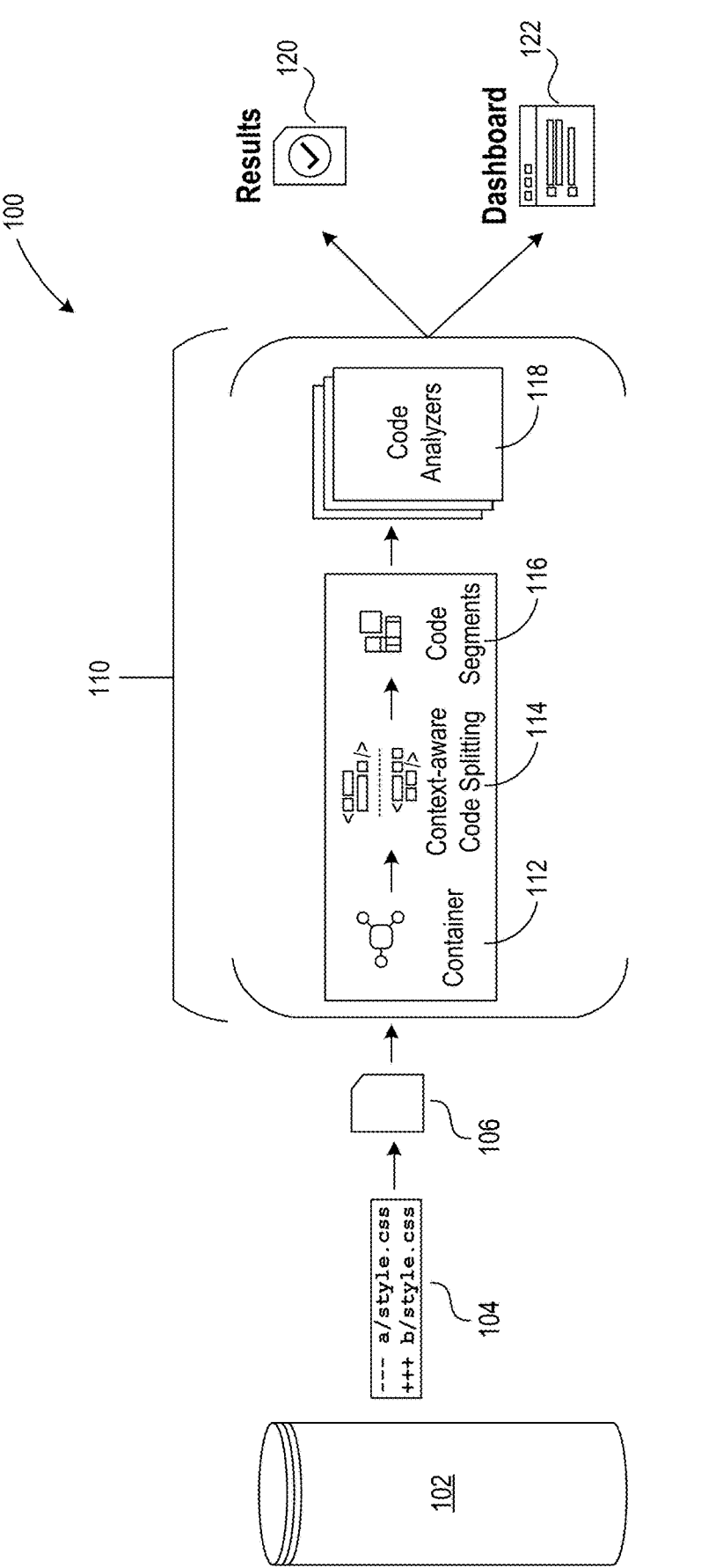
FIG. 1 is a diagram illustrating the components of a security analyzer platform in accordance with one or more embodiments of the disclosed technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit the scope of the disclosed embodiments and techniques in each section to only that section.

Ensuring security in software development is challenging due to the complex and dynamic nature of modern applications. Rapid changes in software technologies make it difficult to address new security vulnerabilities as they are discovered. The large number of interconnected systems allow for unforeseen attack vectors that are difficult to consider during the development process. Security considerations also compete with other priorities such as functionality, performance, and time-to-market pressures. As codebases grow in size and complexity, maintaining a comprehensive understanding of security implications across all components becomes increasingly difficult.

The disclosed technology can be implemented to analyze proposed changes to a codebase and detect security vulnerabilities that can be introduced by the proposed changes. In some embodiments, when a change is proposed to the code of a codebase, a system analyzes the contents of the code difference and splits the code into a plurality of code segments based on the codebase's code context. A code context of a codebase represents information such as the architectural and/or structural information of the code files (such as directory names and locations), project-specific patterns, and/or relationships between different parts of the codebase. The codebase's code context can include information pertaining to all files of the codebase, or can be focused on a portion of the codebase. The codebase's context can also include information such as programming language, dependencies, and/or authorship.

The code context can be used to generate code segments using the proposed changes. Each code segment contains code that can be analyzed as a unit, such as a function or class. The particular way that the system splits a proposed change into code segments can depend on the particular type of security vulnerability being studied. The code segments can be analyzed in parallel by a group of code analyzers, each intended to find a certain type of security vulnerability. This can result in one or more security vulnerability detections, which are then presented to a user. In some implementations, a code analyzer uses a large language model (LLM) to analyze the code context and code segments in a way that is more powerful and flexible than simple pattern-matching techniques. In some implementations, a user can input one or more natural-language security questions, which are processed along with the results of the code analyzers to present a summary to a user, along with a relevant explanation and suggested actions.

Analyzer Framework

Figure 2:
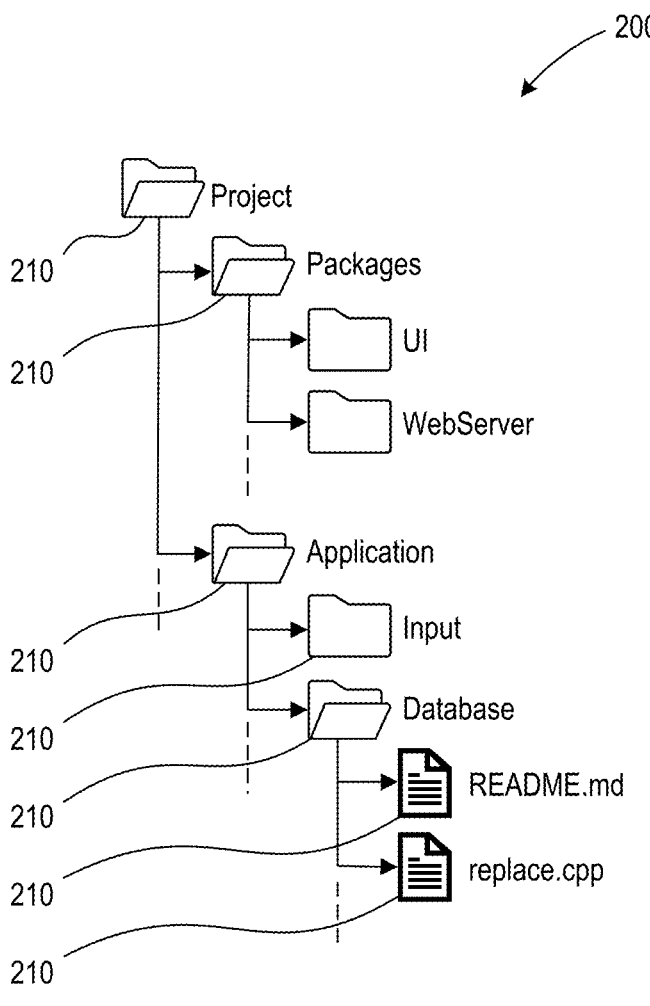
FIG. 2 is a system diagram illustrating a codebase structure.

FIG. 1 illustrates an example architecture of an analyzer platform 100 in accordance with one or more embodiments of the present technology. In some embodiments, the analyzer platform 100 first receives a change request 106, requested by one or more users of a codebase 102, that includes a proposed change 104 to a codebase 102. A codebase 102 includes a collection of directories and files, where some files include text corresponding to one or more programming languages. FIG. 2 illustrates an example codebase 102 in accordance with one or more embodiments of the present technology. The codebase 200 includes a project directory 202 that serves as the main container or root directory for the project. Within the project directory 202, there can be directories 210, 212 and sub-directories 220, 222. Within the directories/sub-directories, there can be files 230, 232. Any directory in the codebase can contain subdirectories and/or files. Files can be of any format and contain any type of data. For example, file 230 can be a readme file that does not contain text corresponding to executable instructions. File 232 can be a code file, such as a C++ file, that contains text corresponding to executable instructions. The text files can include code written in one or more programming languages. Such files can contain a mixture of text that does and does not correspond to executable instructions. For example, a file containing code can also contain code comments or non-executable code, such as an unused function definition, which do not correspond to executable instructions. In some implementations, the directories and files can contain metadata such as a date of creation, a date of previous modification, an owner name, and/or the name of the last user to modify the contents of the directory or file. In some implementations, a codebase 102 is associated with metadata, including a name, a list of users, and a history of changes made by specific users. In some implementations, the codebase is a GitHub repository, with directories for source code, documentation, tests, and configuration files.

The proposed change 104 includes one or more changes made to one or more files in the codebase 102. In some cases, all code edits in the proposed changes are located in a single file. In some cases, the proposed change 104 includes edits to multiple files in the codebase 102. In some implementations, the proposed change 104 can be represented as a difference against the current codebase 102, such as being represented in the git diff format, which indicates changes to one or more files. In one example, the codebase 102 is a GitHub repository, and the change request 106 is a pull request, which contains the proposed change 104 to the codebase 102 and represents a proposal to merge a set of changes from one branch or version of code into another. FIG. 3 illustrates an example git diff file showing the code changes. The git diff format 300 of for proposed change uses a notation to indicate additions, deletions, and the location of changes within files. This allows changes to the codebase 102 to be represented in a text file. The proposed change 104 can also include text that does not change, such as text above or below a portion of changed text, and can include all text from a changed file. Furthermore, the proposed change 104 can include metadata about the changes, including information about a user who requested the change request 106, information about users who contributed to the proposed change 104, and comments included with the change request 106. The proposed change 104 can also contain the text of other files in the codebase in order to provide context to the code change, such as including code dependencies.

Upon receiving the proposed change 104, the analyzer platform 100 processes the proposed change using a code analyzer framework 110. The code analyzer framework 110 represents an approach to processing the data and metadata of a change request 106 for processing by one or more code analyzers 118. The code analyzer framework 110 can be implemented inside of one or more containers 112 for troubleshooting (e.g., ephemeral containers in Kubernetes). A container 112 is an isolated software environment tailored to the execution of code pertaining to the code analyzer framework 110.

Upon receiving the proposed change 104, the code analyzer framework 110 determines a code context 114 for the proposed change 104 based on the codebase 102. As explained above, the code context represents architectural and/or structural information of the files, project-specific patterns, and/or relationships between different parts of the codebase 102. In some cases, known security vulnerabilities can be applicable to one or more specific code contexts. Information that can be used to determine the code context includes file data, file metadata, file paths, and/or user data. Examples of information in a code context can include a file type, programming language, dependencies used (e.g., frameworks, modules, libraries), environment (e.g., frontend, backend), and details of the users creating or requesting the proposed changes (e.g., past behavior, edit frequency, security credentials). The context of the codebase 102 can include information pertaining to all files of the codebase 102 or can include information pertaining to only a portion of the codebase 102. The code context 114 for the proposed change 104 includes aspects of the context of the codebase 102 that pertain to the proposed change 104.

Once a code context 114 has been determined for a proposed change 104, the code context 114 is used to split the proposed change 104 into code segments 116. This can be performed by the code analyzer framework 110 or by one or more code analyzers 118. A code analyzer 118 is a software program designed to process the proposed change 104 to a codebase 102 and the code context 114 of the proposed change 104 to determine if a security vulnerability exists in the proposed change 104. Each code analyzer 118 can be associated with a corresponding aspect of security concerns, including but not limited to: SQL injection, buffer overflow, cross-site scripting, and authentication validation. In some implementations, a code analyzer framework 110 and/or one or more code analyzers 118 process the proposed change 104 and the code context 114 to generate code segments 116. In some implementations, each code analyzer 118 generates code segments 116 corresponding to an aspect of security concerns associated with the code analyzer 118. The one or more code analyzers 118 analyze their corresponding code segments 116 in parallel with other code analyzers 118 to detect potential security vulnerabilities in the proposed change 104. In some implementations, a plurality of code analyzers 118 associated with the same code analyzer framework 110 execute in parallel.

Figure 4:
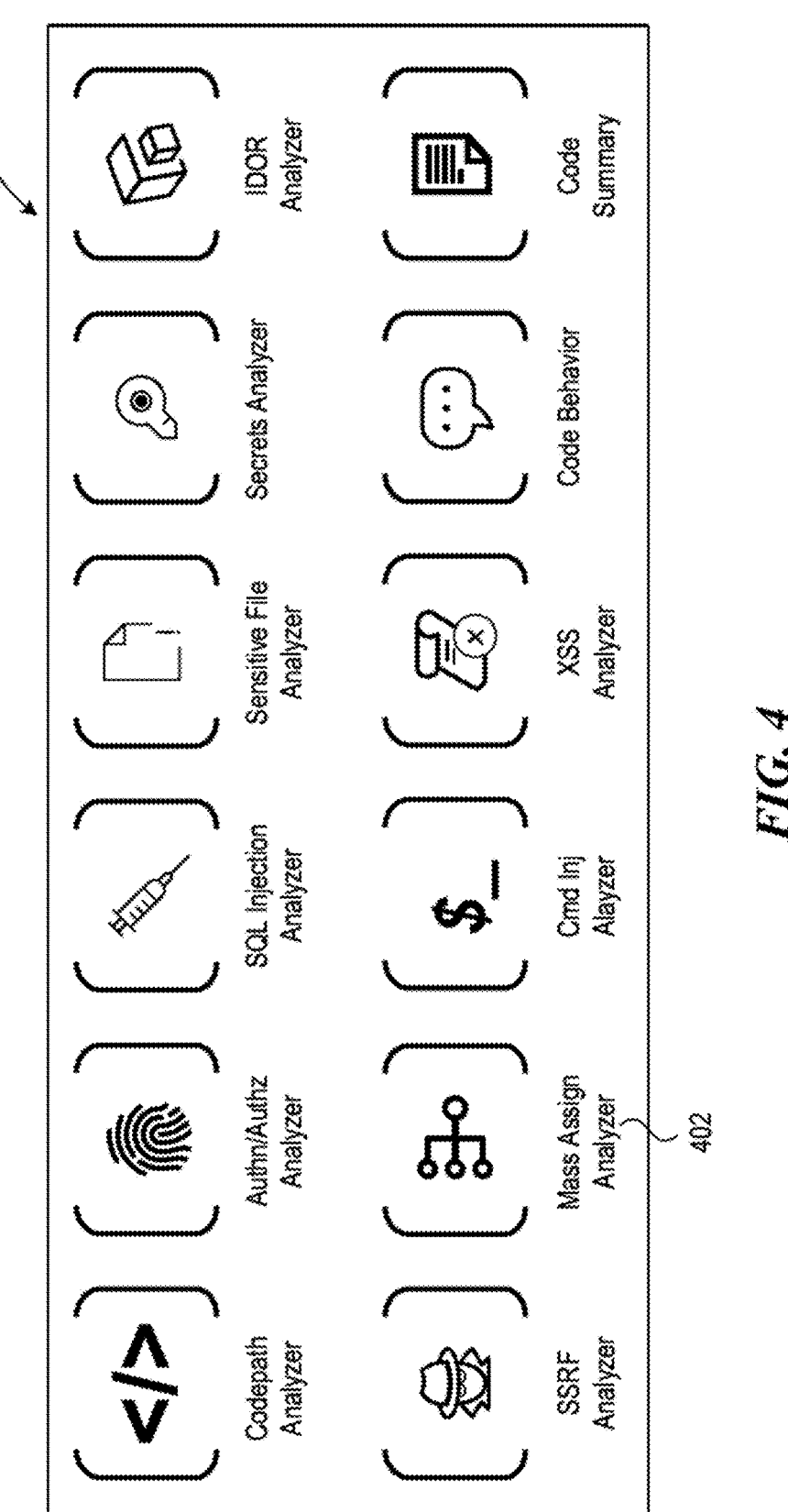
FIG. 4 is a diagram illustrating example code analyzers and corresponding security aspects in accordance with some embodiments of the disclosed technology.

FIG. 4 illustrates a list 400 of example code analyzers 402 under a code analyzer framework. The example code analyzers 402 include analyzers for code paths, authentication/authorization, SQL injection, sensitive files, GitHub secrets, insecure direct object references (IDOR), server-side request forgery (SSRF), mass assignment, command injection, cross-site scripting (XSS), code behavior, and code summarization.

Figure 11:
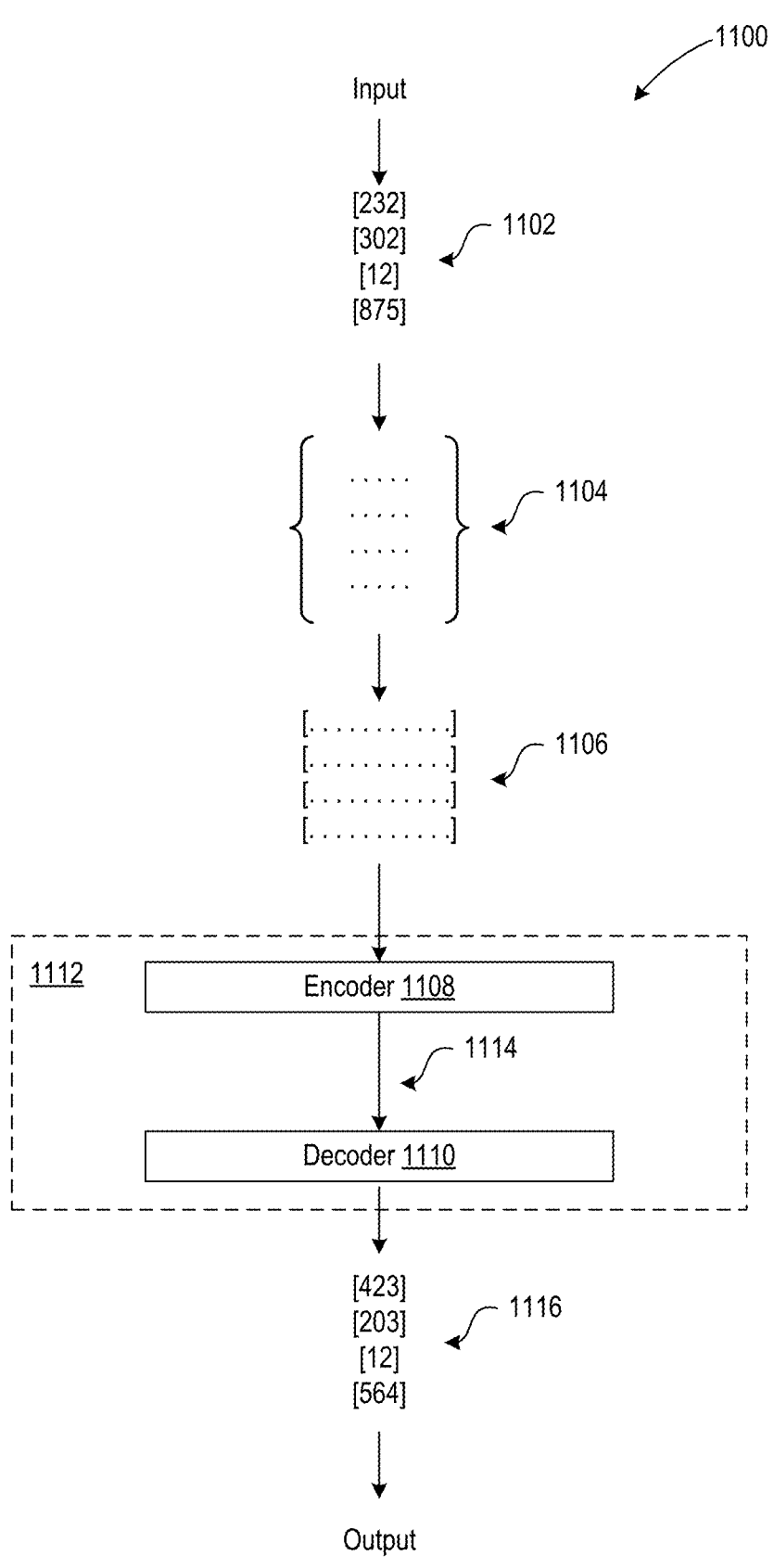
FIG. 11 is a block diagram that illustrates a transformer-based processing system.

In some implementations, artificial intelligence (AI) models are used. Examples of AI models include large language models (LLMs), such as schematically depicted in FIG. 11.

In some implementations, one or more code analyzers 118 use one or more LLMs to process code context 114, code segments 116, and one or more prompts in order to detect a security vulnerability. An LLM can be used to understand the context and semantics of code changes more effectively, finding more vulnerabilities and avoiding more false-positives than other pattern-matching techniques, such as regular expression (i.e. RegEx) matching. These models can additionally generate natural-language explanations of detected vulnerabilities and/or provide suggestions for code improvements. In some embodiments, LLMs can be used to process natural language security questions, allowing for more flexible and more easily understood security policies. The integration of AI models enables a system to quickly adapt to new security threats and coding practices over time, without the need to manually enter new patterns corresponding to these new threats, improving the accuracy and efficiency of the security analysis process.

The code analyzers 118 produce one or more security analysis reports 120. A security analysis report 120 can include information such as the name of one or more code analyzer(s) 118 used to produce the report, the corresponding security aspect(s) of the one or more analyzer(s), detected security vulnerabilities, risk level or urgency level associated with each detected security vulnerability, and/or a time taken for an analyzer to detect a security vulnerability. The content of the security analysis reports 120 can be displayed on a dashboard user interface 122. The dashboard user interface 122 can present a security analysis summary, including the information contained in one or more security analysis reports 120. In some implementations, the dashboard user interface 122 includes security analysis summaries associated with one or more change requests 106 corresponding to one or more proposed changes 104 to one or more codebases 102.

Figure 5A:
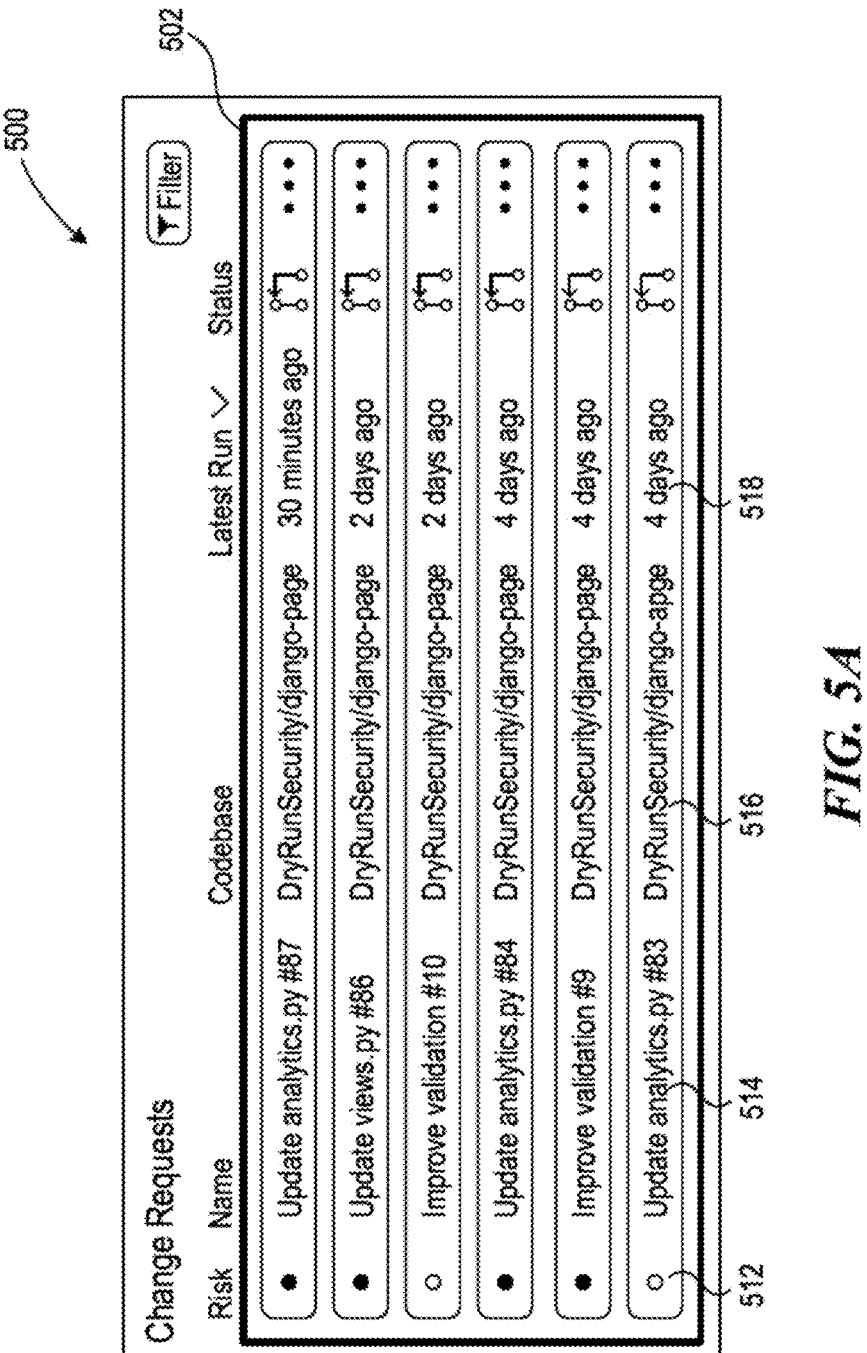
FIG. 5A is a user interface displaying a web-based dashboard for a security analysis system in accordance with one or more embodiments of the disclosed technology.
Figure 5B:
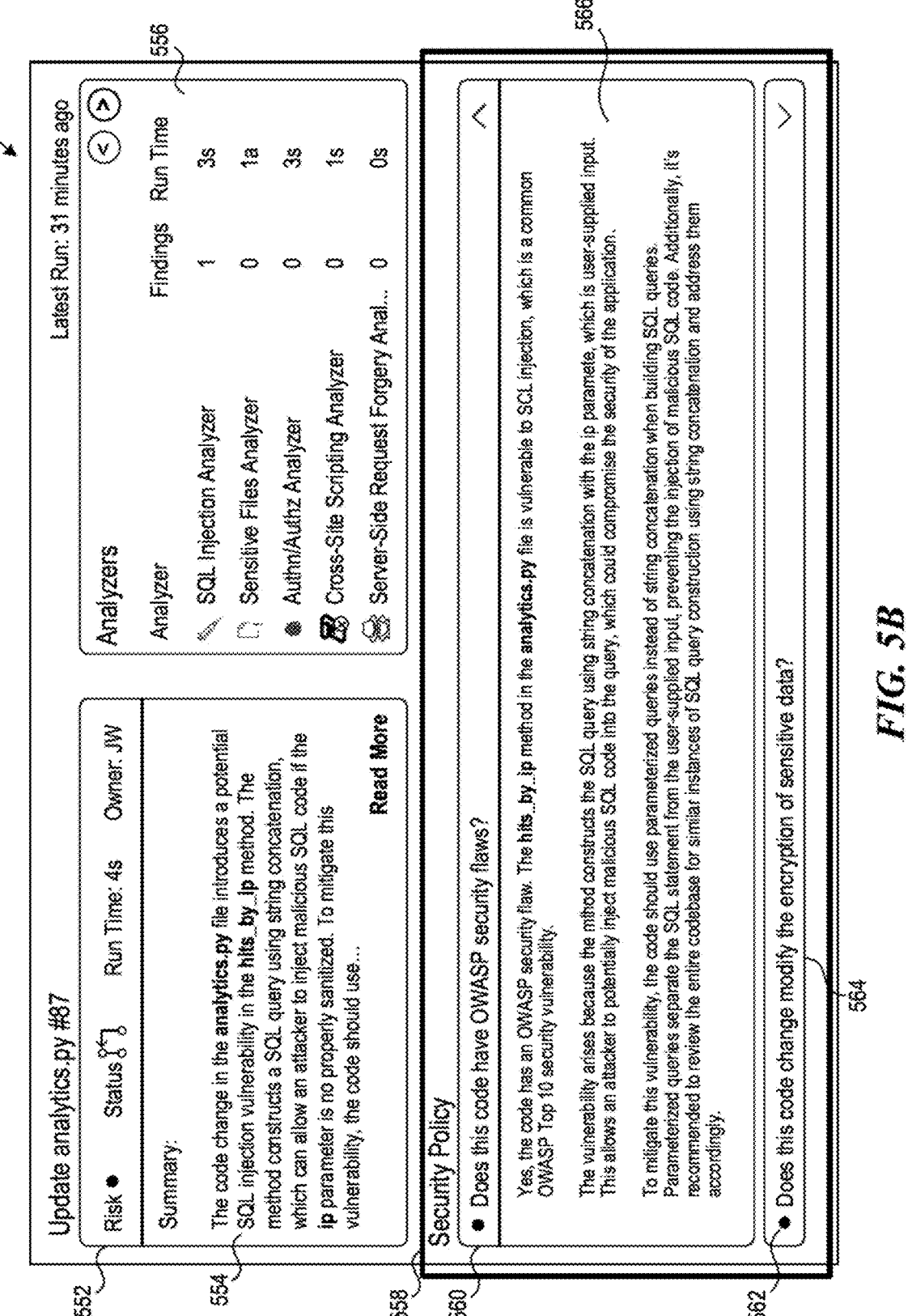
FIG. 5B is a user interface displaying a detailed view of a specific proposed change analysis within a dashboard interface in accordance with one or more embodiments of the disclosed technology.

FIGS. 5A and 5B illustrate user interfaces for presenting security analysis results in accordance with one or more embodiments of the disclosed technology. The user interface 500 can display a change request list 502. Each change request 510 in the list 502 can be associated with a security analysis performed on a proposed change to a codebase; thus each change request 510 is associated with a proposed change and with a codebase. A security analysis can include analysis of code segments by a code analyzer, for example, by a process like that illustrated in FIG. 1. A security analysis can result in a security analysis report, which contains details of the results of the security analysis, and a security analysis summary, which summarizes the results contained in one or more security analysis results in a readable format. The change requests 510 can include information such as a status indicator 512, indicating a number or severity of security vulnerabilities indicated in the security analysis associated with the change request; a change request name 514, which can be determined by the requestor at the time that the change request is submitted; a codebase name 516, corresponding to the codebase associated with the proposed changes of the change request; and a timestamp 518, indicating the time that the change request was submitted or the time of the last change to the change request. Other possible information includes: the name of the user who submitted the change request, the name of one or more users who contributed to the change request, and an indication of whether the change request has been accepted and the proposed changes applied to the codebase.

In some implementations, the codebase corresponds to a GitHub repository, and change requests correspond to pull requests to the repository. In some implementations, the user interface 500 identifies a list of high-risk change requests. Options for filtering these high-risk change requests can be provided, allowing users to filter by factors such as codebase, time period, or security vulnerability type.

The user interface 550 can display a detailed view for a selected change request 552, comprising a security analysis summary 554 summarizing a security analysis report that corresponds to a security analysis performed on the proposed change associated with the selected change request 552. In some implementations, the security analysis summary 554 is the same as the security analysis report. This detailed view can include a section displaying information about code analyzers 556 used in the security analysis, including the name of a code analyzer, the time that elapsed during the execution of the code analyzer, and an identification of the security vulnerabilities determined by the code analyzer.

The user interface 550 can include a security policy section 558 displaying a natural-language security question 560. This natural-language security question can be processed by a code analyzer to detect the existence of an associated security vulnerability in a proposed change. In some implementations, the natural-language security question is supplied by a user by, for instance, entering it into a user interface. The interface 550 can provide an indication, such as a vulnerability indicator 562, of whether the natural-language security policy corresponds with the detection of an associated security vulnerability. In some implementations, the indication is be generated in part by processing the natural-language security policy with a code analyzer to determine if an associated security vulnerability exists in a proposed change. In some implementations, the natural-language security question is processed using an AI model, such as an LLM. In some implementations, the natural-language security policy and a set of results from a plurality of code analyzers are processed by an LLM to detect the existence of an associated security vulnerability in a proposed change In some implementations, when a security vulnerability associated with a security policy is detected, it can activate other systems that, for example, send a warning to security experts.

In some implementations, the natural-language security question 560 is associated with a code policy, which includes natural-language instructions pertaining to detecting and responding to a security vulnerability. For example, a code policy can include a title 564, along with natural-language questions that are used to determine a security vulnerability, explain the security vulnerability, and make suggestions to mitigate the effects of the security vulnerability. This can be shown in a code policy result 566 of the user interface 550. In some implementations, a system processes these natural-language instructions using an AI model, such as an LLM. In such implementations, a code policy can also include instructions to the LLM, such as how to format responses, and can include background information on a security vulnerability for the LLM to use in a response. In some implementations, a code policy is processed as part of a code analyzer.

Each change request 510 is associated with a security analysis performed on a proposed change to a codebase. In some implementations, each of multiple change requests 510 is associated with a different security analysis performed on the same proposed change to a codebase. In some implementations, each of multiple change requests 510 is associated with a proposed change to a different codebase. In some implementations, each of multiple change requests 510 are associated with a different security policy, but can be associated with the same security analysis, proposed change, and/or codebase. In some implementations, the user interface 500 includes an awareness digest. The awareness digest can summarize or include information about multiple change requests, including a report of the most high-risk changes being proposed by the change requests.

In some implementations, a system identifies a set of security analysis reports, where each security analysis report corresponds to a security analysis performed on a proposed change for a codebase, where the proposed change comprises one or more changes to one or more files in the codebase. Each security analysis can comprise the output from each of a set of code analyzers used to detect potential security vulnerabilities in the proposed change. The system generates, based on the set of security analysis reports, a change request security summary. The change request security summary synthesizes information pertaining to security vulnerabilities detected in a change request associated with the proposed change. The change request security summary can be specific to a particular aspect of security concerns by, for example, being generated based on the security analyses generated by a single code analyzer. The system generates a second change request security summary for a second proposed change to a second codebase, based on a second set of security analysis reports corresponding to a second security analysis performed on the second proposed change. The system generates, from the first and second change request security summaries, an awareness digest that identifies security vulnerabilities in both the first and second proposed changes. The awareness digest can be associated with a particular security concern, and can be generated from change request security summaries that only contain vulnerabilities, detected in the first and second proposed changes, associated with the particular security concern. In some implementations, the system generates a second awareness digest, from the first and second proposed changes, which identifies security vulnerabilities, detected in both the first and second proposed changes, associated with a second security concern. In some implementations, the system uses an LLM to generate a change request security summary and/or an awareness digest. In some implementations, the awareness digest also includes a natural-language summary describing the security vulnerabilities detected in the proposed changes and their possible security implications.

In some implementations, a system identifies a set of security analysis reports, where each security analysis report corresponds to a security analysis performed on a proposed change for a codebase, where the proposed change comprises one or more changes to one or more files in the codebase. Each security analysis can comprise the output from each of a set of code analyzers used to detect potential security vulnerabilities in the proposed change. The system causes presentation, on a user device, of a user interface. The user interface includes a list of change requests, where each change request is associated with a proposed change to a codebase, and further includes a detailed view of a selected change request, containing information from a security analysis report corresponding to a security analysis performed on the proposed change associated with the selected change request. In some implementations, a first change request is associated with a first proposed change to a first codebase, and a second change request is associated with a second proposed change to a second codebase, where the first codebase is different from the second codebase.

Figure 6:
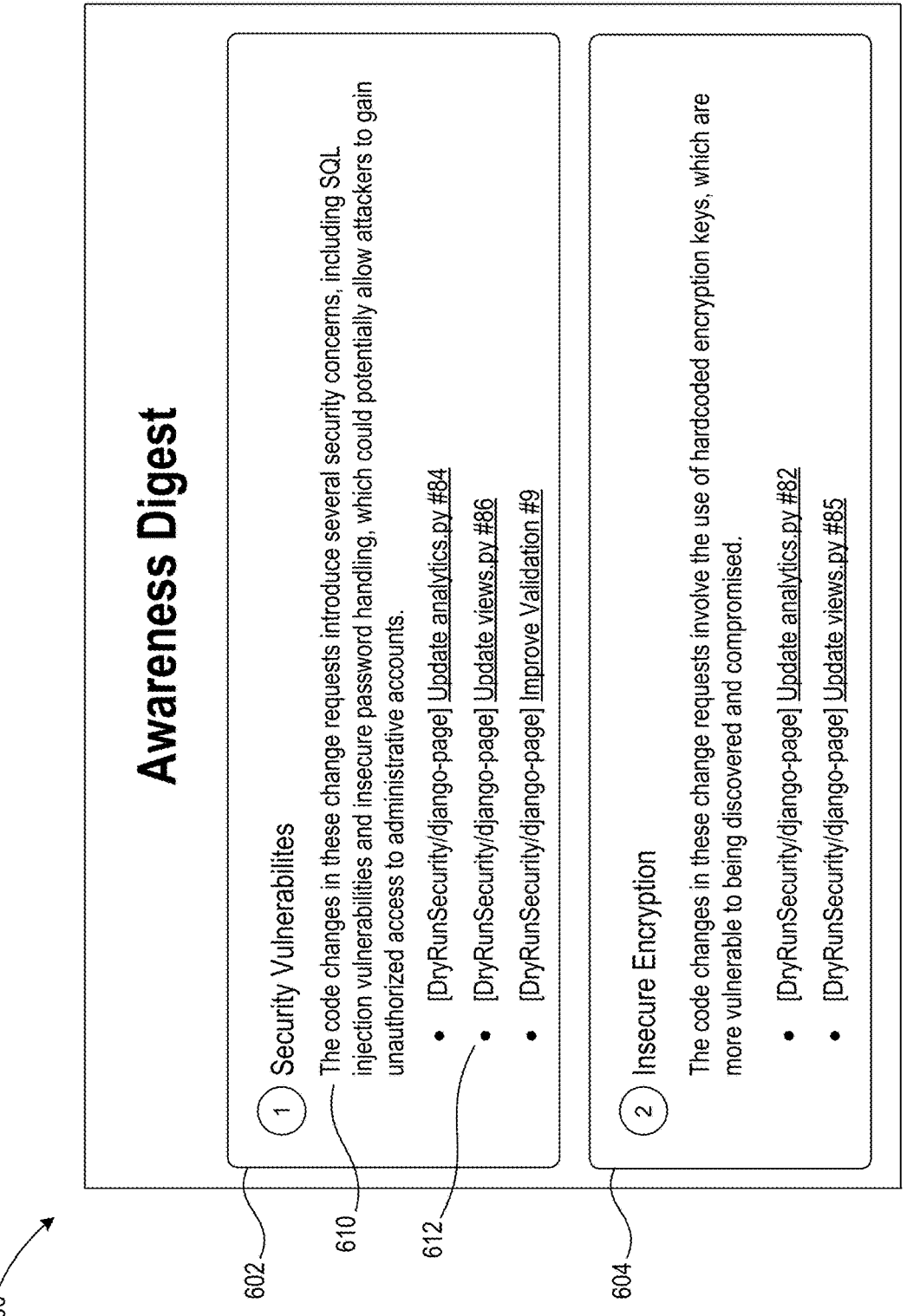
FIG. 6 depicts a user interface displaying the results of one or more code analyzers in accordance with one or more embodiments of the disclosed technology.

FIG. 6 illustrates a user interface 600 that provides an overview of security analysis results for one or more proposed changes to one or more codebases in accordance with one or more embodiments of the disclosed technology. The user interface 600 can display aggregated information from multiple security analysis reports. In some implementations, the aggregated information can be referred to as security awareness or awareness.

The user interface 600 can include multiple security analysis summaries, 602, 604. These can present condensed information about the security analysis reports created by the code analyzers. Each summary can focus on a specific type of security vulnerability or group related vulnerabilities together. For instance, summary 602 can highlight SQL injection vulnerabilities, while summary 604 can address issues related to insecure password handling. Each security analysis summary 602, 604 can include information from one or more security analysis reports from one or more code analyzers covering one or more proposed changes to one or more codebases. Each security analysis summary 602, 604 can include any information pertaining to security analysis performed on a proposed change, including information that no security vulnerabilities of a certain type were detected.

Within the security analysis summaries 602, 604, the interface can provide detailed information about specific vulnerabilities. For example, in summary 602, a description 610 of a security vulnerability is displayed with a list of change requests 612 corresponding to proposed changes where an instance of the security vulnerability was detected. The change requests 612 that have been flagged for security vulnerabilities can also be displayed with information about the change request 612, including the name of the codebase, a description of the change request (such as a name), identities of one or more users who requested the change, and/or a link to more detailed information about the change request. These links can allow users to quickly access relevant code changes for more detailed analysis.

The security analysis summaries 602, 604 can include indication as to the severity or urgency of different security concerns. This can include color-coding, icons, or other graphical elements that indicate the risk level associated with each vulnerability or group of vulnerabilities. In some implementations, the user interface 600 can include interactive elements that allow users to filter or sort the displayed information, such as allowing users to only view vulnerabilities of certain (one or more) severities, from a certain codebases, or of certain types of security concerns.

The user interface 600 can also provide summary statistics or metrics of the security status across multiple codebases or change requests. This can include information such as the total number of vulnerabilities detected, the number of high-risk issues, or trends in vulnerability detection over time. Such aggregate data can help users understand the broader security landscape of their development environment.

Figure 7:
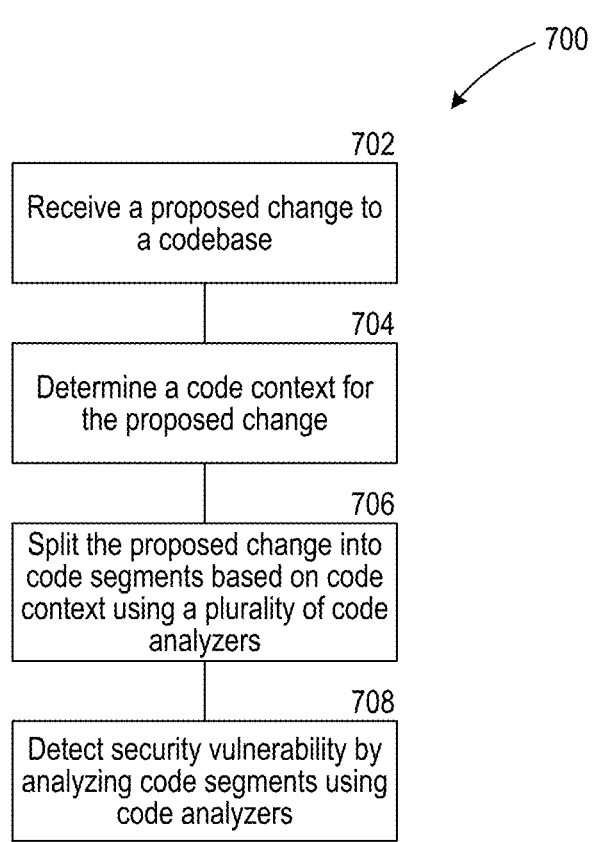
FIG. 7 is a flow diagram illustrating a process for analyzing a proposed change to a codebase to detect a security vulnerability in accordance with one or more embodiments of the disclosed technology.

FIG. 7 is a flow diagram 700 illustrating a process for analyzing proposed changes to a codebase for security vulnerabilities in accordance with one or more embodiments of the disclosed technology. This process can be carried out on any computing system, including distributed or virtual systems.

At 702, the system receives a proposed change to a codebase. A codebase includes a collection of directories and files, where some files include text corresponding to one or more programming languages. A proposed change includes one or more changes to one or more files of the codebase.

At 704, the system determines a code context for the proposed change. A code context includes data about the proposed change, such as file types or programming languages present in the proposed change, which will help in understanding how the code is used and whether any proposed changes represent a security vulnerability. Thus, a code context can correspond to a set of known security vulnerabilities. For example, some programming languages have built-in functions that are considered unsafe. A function that accepts user input might allow access for a malicious actor to perform a SQL injection. The names of these functions, and the contexts in which they can be unsafe, can be different for each programming language.

The code context can be associated with a set of code dependencies. These code dependencies can include frameworks (such as Django or Ruby on Rails), libraries, and packages, which are used by one or more files of the codebase. Dependencies provide objects, such as functions and classes, that can be used by files in the codebase. Each code dependency can be written in one or more programming languages with certain known security vulnerabilities, and can introduce a set of functions with another set of security vulnerabilities. The code context can correspond to an application type of the codebase, and the application type can be associated with a set of known security vulnerabilities. An application type of a codebase characterizes a functioning portion of the code in the codebase (e.g., files that together make up a program, a module, a package, or a component of a larger program), which can include the entire codebase. An application type can be associated with one or more programming languages, one or more code dependencies, and/or the behavior of the functioning portion of the code. For example, an application that is expected to run on the backend of a service can be considered more safe than an application that accepts user input and can thus allow unauthorized access by a malicious actor. If a file in a proposed change relies on other files in the codebase to function, the other files do not need to be part of the proposed change for the application type to be part of the code context of the proposed change.

Furthermore, the code context of the proposed change can include metadata of the proposed change, such as file metadata (e.g., file name, file type, date created, date modified, author name, or name of the last user to modify the file) or file paths. For example, files with certain names or that are in a directory of a certain name can be associated with one or more known security vulnerabilities, which can be detected by a code analyzer. The nature or existence of this vulnerability can depend on an application type, framework, or other code dependency used by the code. The code context can further include user metadata about the proposed change such as the identity of the user who proposed the change, the history of the user who proposed the change, and comments submitted with the proposed change. For example, if a user proposing a change has not proposed many changes to the corresponding codebase in the past, then the user may be less familiar with the code and more likely to unintentionally introduce a security vulnerability.

The code context of the proposed change can include code contexts for individual files or groups of files. Thus, the programming languages used in a specific file can be included in the code context of that specific file, independently of the code context of a different file, and be included in the code context of the proposed change. In some implementations, a code context is determined based on at least a file type of one or more changed files or a programming language used in one or more changed files. In some implementations, an application type and/or a code context is determined based on at least one of: a file type of one or more files in the codebase, a programming language used in one or more files in the codebase, a code dependency used by one or more files in the codebase, or a user who made one or more changes included in the proposed change to the codebase.

At 706, the system splits the proposed change based on the code context using a plurality of code analyzers. In some implementations, a plurality of code analyzers generates sets of code segments, each containing text from the proposed change. A code analyzer is a software program designed to process the proposed change to a codebase and the code context to determine if a security vulnerability exists. Each of the plurality of code analyzers can be configured to analyze a specific aspect of security concerns and/or multiple aspects of security concerns. Each code analyzer can be configured to split the proposed changes into a corresponding set of code segments according to a corresponding aspect of security concerns. Any code segment in any set of code segments can contain any text from the proposed change to the codebase. A single code segment can contain text from multiple changed files, and two different code segments can contain the same text from the same file. In some implementations, each of the plurality of code analyzers is configured to generate a different corresponding set of code segments. In some implementations, the system splits the proposed change into code segments to be processed by the code analyzers, which in turn generate another set of code segments to process.

The analyzers can use the code context to determine how to generate a set of code segments. In some implementations, a code analyzer uses the code context, including the programming language of a specific file, to determine that certain changed text does not correspond to an executable command, such as when the text is a comment in a code file. The code analyzer can then choose to exclude this text in any code segment of its corresponding set of code segments. Conversely, in some implementations a portion of text in the proposed change is determined, based at least in part on the code context, to correspond to an executable instruction, and thus is included in at least one code segment. In some implementations, a code analyzer can determine that a changed file has a name or a path that corresponds to a known security vulnerability, and include changes to the file in a code segment. Furthermore, the code context can include one or more functions that are associated with a known security vulnerability, such as functions that are included in code dependencies, which can be used in part to determine the set of code segments. For example, if a code analyzer corresponds to a security aspect that covers the security vulnerability known to be associated with a particular function, then the code segments corresponding to that code analyzer can include any uses of the function, the classes or functions that it is used in, and/or any files it is used in that are relevant to the proposed change.

In some implementations, a code analyzer can determine that a portion of text has a higher risk of containing a security vulnerability based at least in part on a characteristic of the user who proposed the change or who contributed to changing the portion of text, such as the user having a low number of confirmed changes or a user having not passed a security training program, and include the portion of text in at least one code segment.

At 708, the system detects whether a security vulnerability exists in the proposed change. This detection is performed by using the plurality of code analyzers to analyze their corresponding sets of code segments, along with the code context of the proposed change. In some implementations, these analyses are performed in parallel.

The analysis of a set of code segments depends on the code context of the proposed change. For example, if the code context includes a dependency with one or more functions that are associated with a known security vulnerability, and the proposed change includes adding one of these functions to a file, then the code analyzer can identify that the known security vulnerability is present in the proposed change.

The result of the analysis performed by a code analyzer is a security analysis report. A security analysis report can include information such as the name of code analyzer used to produce the report, the corresponding one or more security aspects of the code analyzer, any detected security vulnerabilities, a risk level or urgency level associated with each detected security vulnerability, and/or a time taken for the code analyzer to execute and detect a security vulnerability.

Code Analyzer

Figure 8:
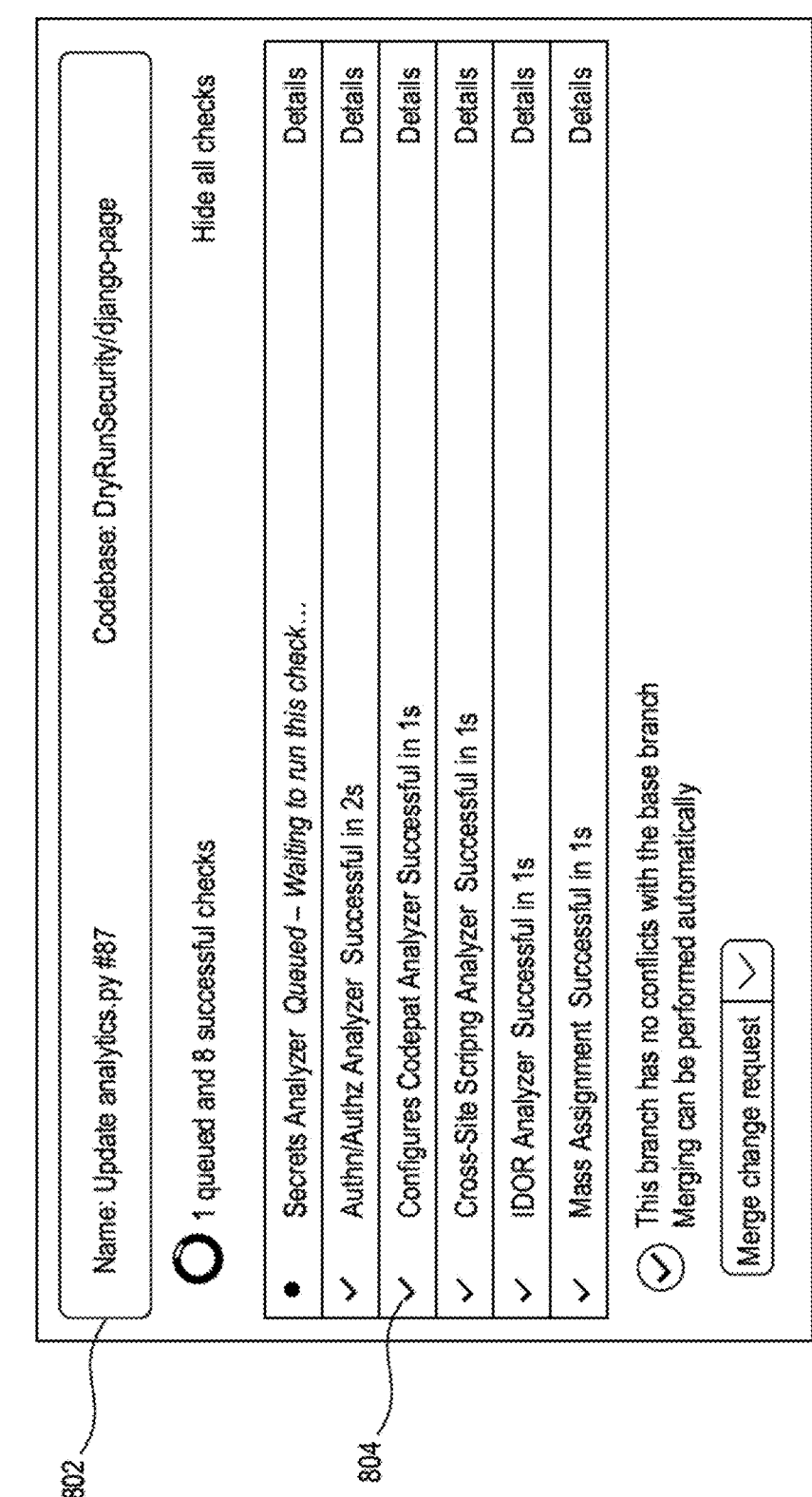
FIG. 8 is a user interface for displaying summaries of one or more security analysis reports in accordance with one or more embodiments of the disclosed technology.

Referring back to FIG. 4, the code analyzer framework includes a list of code analyzers 402 to analyze different aspects of the proposed code change. FIG. 8 illustrates a user interface 800 that displays information related to a code change request and associated security analyses in accordance with one or more embodiments of the disclosed technology. The interface can present data about a change request corresponding to a proposed change to a codebase, and multiple security analysis reports 804, each associated with one or more code analyzers.

The change request 802 can be displayed with related information, such as the name of the change request 802 and/or the identify of a user who submitted the request. Information can also be displayed about the associated proposed change, such as the associated codebase, the number of files changed, and/or the names of users who contributed to the change.

Each security analysis report 804 can correspond to an analysis performed by a different security analyzer that has been run on the proposed change associated with the change request 802. The code analyzers can each be designed to focus on an associated type of security vulnerability or aspect of security concerns. Each security analysis report 804 can include information associated with a corresponding code analyzer, such as the name of the code analyzer, the current status of the analysis, the execution time for the code analyzer, and/or an indication of the results of the analysis. The current status of the analysis can include a queued status indicating that an analysis will be performed but has not yet started, a running status indicating that an analysis is currently in progress, or a completed status indicating that an analysis has finished. Information about the results of the analysis contained in a security analysis report 804 can include a summary of any vulnerabilities detected, their severity levels, and potentially affected areas of the codebase. These can be conveyed with graphical elements, for example, by assigning a different color to vulnerabilities of different severities. Each security analysis report 804 can also include a link or button for accessing more detailed information about the analysis results and/or direct a user to an affected portion of code in the codebase. In some implementations, the interface can include filtering or sorting options for the security analysis reports 804. For example, users can sort the reports based on criteria such as execution time, severity of findings, or the status of the analysis.

An analysis by a code analyzer or code analyzer framework can include processing text using one or more AI models such as an LLM. This LLM does not have to be fine-tuned to security analysis, and can be a generic LLM such as ChatGPT by OpenAI or Claude by Anthropic.

In some implementations, a code analyzer can use an LLM to determine a security vulnerability by using a series of pre-defined questions intended to produce deterministic output by the LLM. In many implementations of LLMs, the output given in response to receiving a prompt is not deterministic (e.g., only dependent on the prompt), but includes a degree of randomness. This is because many LLMs create a probability distribution over possible outputs and then choose an output randomly according to the probability distribution. Therefore, an LLM can produce different outputs when given the same prompt. However, it can be advantageous for a security analysis platform to be deterministic, since the presence (and thus detection) of a security vulnerability should not vary when the input (e.g., the proposed change and the code context) does not change.

Deterministic outputs from an LLM can be achieved using an incremental inquiry chain. An incremental inquiry chain is a series of prompts or assistance questions that are each expected to generate short, specific responses that result in a deterministic overall output. For example, a broad prompt such as "does this code include a SQL injection vulnerability?" requires an LLM to analyze extensive context and can result in a lengthy output which is more prone to variability. An incremental inquiry chain instead prompts an LLM with simpler questions asked in sequence, such as "is there a function present?", "does the present function accept a string?", "is the string associated with user input?", eventually leading to a final output. Each prompt in the chain requires less context and analysis, and restricts the possible outputs (e.g., to short sentences or a Boolean value). These features increase the likelihood of an LLM generating the same final output when given the same initial input. The incremental inquiry chain can include branches based on the response given by the LLM at each step. Inquiries in the chain can also include prompts indicating that the LLM should summarize content or implement other strategies for improving LLM response, such as few-shot prompting, constrained decoding, or retrieval augmented generation.

In some implementations, a code analyzer uses an incremental inquiry chain to detect a security vulnerability associated with a corresponding aspect of security concerns. It can use a pre-defined incremental inquiry chain, which is specific to the corresponding aspect of security concerns, to detect a security vulnerability by repeatedly prompting an LLM with an inquiry, one or more code segments, and a code context. Such a process, where data (e.g., a code segment and a code context) are repeatedly reviewed using a series of incremental inquiries is called a multi-pass inquiry method.

In some implementations, the use of an LLM involves the identification of assistance data based on the code context. The assistance data is intended to supply an LLM with specific technical details about a code context, such as details about a programming language or known security vulnerabilities in a dependency, that the LLM cannot otherwise produce or use. For example, this can include retrieval-augmented generation (RAG), in which the code analyzer searches external databases (such as a knowledge database or website) for information that is then incorporated into an LLM. This can be prompted, for example, by an inquiry in an incremental inquiry chain, which is designed to determine if and/or when an LLM requires more information in order to answer an inquiry in the chain. Code analyzers using assistance data can retrieve it from a knowledge database that is organized based on language, framework, vulnerability, or any other relevant category. In some implementations, a code analyzer identifies assistance data based on the code context, and processes the assistance data and one or more prompts using an LLM. In some implementations, a code analyzer identifies assistance data based on the code context and processes the assistance data and a set of code segments using an LLM.

An analysis by a code analyzer can include natural-language security questions, which can be supplied by a user, that are processed by a code analyzer to detect the existence of a security vulnerability. A natural-language security question can be processed, for example, by an LLM used by the code analyzer. If multiple natural-language security questions are used, they can be sequential (e.g., the output of analyzing one question is used to answer others), parallel (e.g., the questions are independent), or a combination of both. In some implementations, analysis by a code analyzer of a corresponding set of code segments involves providing, to an LLM, one or more natural language security questions according to an aspect of security concerns corresponding to the code analyzer, and detecting whether a security vulnerability exists by processing the one or more natural-language security questions. In some implementations, a natural-language security question that is associated with a particular security vulnerability is received from a user, and is used at least in part to determine, using a code analyzer, that the particular security vulnerability exists in a proposed change to a codebase. In some implementations, a natural-language security question, associated with a particular security vulnerability, is identified, and a security vulnerability in the proposed change is determined at least in part by processing the natural-language security question using a code analyzer.

An analysis by a code analyzer can include the use of code policies. A code policy includes a natural-language security question and one or more actions to be taken in response to a detection of a security vulnerability related to the natural-language security question. These actions can include processing one or more natural-language commands. Any component of a code policy can be supplied by a user. A code policy can be processed, for example, by an LLM used by the code analyzer.

The results of a code analyzer can be stored for later use. For example, if a code analyzer identifies a pattern in a proposed change that is uncommon, the pattern can be stored to be used later as an example. In some implementations, a code segment is anonymized and stored in a repository for later use. When a code segment is anonymized, data and metadata are removed from the code segment, such that the original source of the code segment cannot be identified based on the anonymized code segment. This can involve removing names from the code segment or changing the filename of a file where the text came from.

The results of a code analyzer can be further processed for useful information. For example, a summary can be made of one or more security vulnerabilities detected in one or more proposed changes in one or more codebases. In some implementations, a first summary describing the results of a detected security vulnerability is produced, a second summary describing the results of a second detection of a security vulnerability in a second set of proposed changes from a second codebase is received, and a summary is generated that describes the changes in the codebases based on the first and second summaries. A summary describing the results of a detected security vulnerability can include the output of a code analyzer, or the result of summarizing the output of one or more code analyzers. In some implementations, a first security vulnerability is detected in a first proposed change to a first codebase, a second security vulnerability is detected in a second proposed change to a second codebase, and a summary is generated describing the changes in the codebases based on the security vulnerability detected in the codebase and on the second security vulnerability detected in the second codebase.

Figure 9:
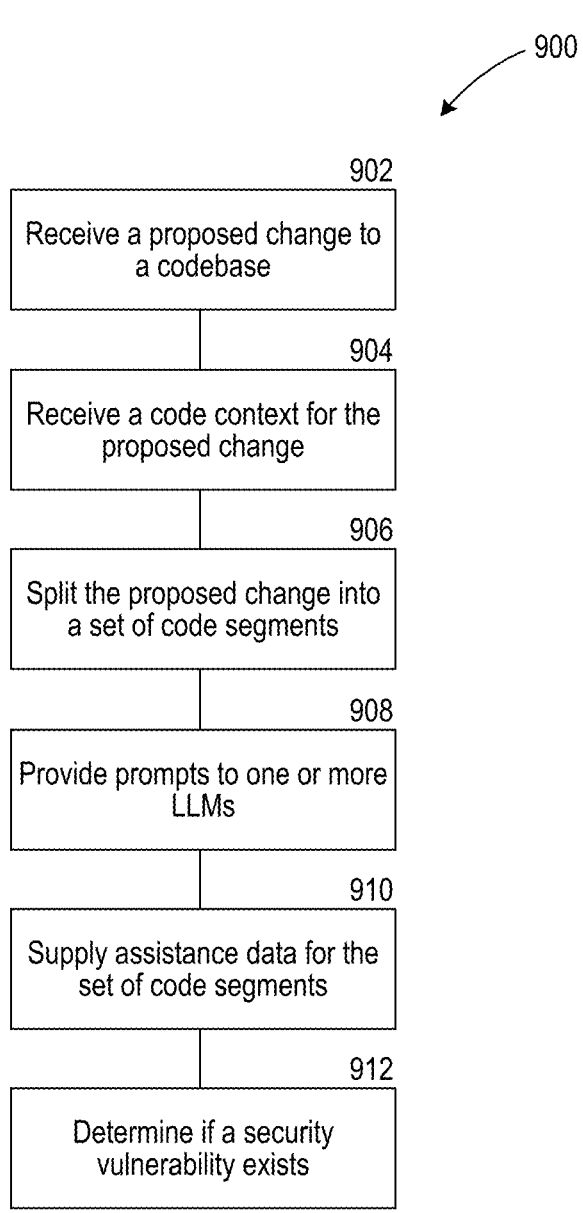
FIG. 9 is a flow diagram illustrating a process for analyzing a proposed change to a codebase using one or more LLMs to detect a security vulnerability.

FIG. 9 is a flow diagram 900 illustrating a process for a system to analyze proposed changes to a codebase for security vulnerabilities. This process can be carried out on any computing system, including distributed or virtual systems.

At 902, the system receives a proposed change to a codebase. A codebase includes a collection of directories and files, where some files include text corresponding to one or more programming languages. A proposed change includes one or more changes to one or more files of the codebase.

At 904, the system receives a code context for the proposed change. A code context includes data about the proposed change, such as file types or programming languages present in the proposed change, which helps in understanding how the code is used and whether any proposed changes represent a security vulnerability. The code context can correspond to an application type of the codebase, and the application type can be associated with a set of known security vulnerabilities. Furthermore, the code context of the proposed change can include metadata of the proposed change, such as file metadata (e.g., file name, file type, date created, date modified, author name, or name of the last user to modify the file) or file paths.

In some implementations, receiving the code context involves the system determining the code context based on the proposed change and/or the data and metadata in the codebase. This can involve processing the proposed change, codebase data, and/or codebase metadata using an LLM to generate a code context.

At 906, the system splits the proposed change into a set of code segments. This can involve generating a set of code segments, where each code segment includes text from the proposed change. The system can focus on a particular aspect of security concerns, and generate code segments based on the particular aspect. The code segments can be split according to the set of known security vulnerabilities that corresponds to the code context. The code analyzer can consider the purpose of text in a proposed change when generating code segments. For example, if a portion of text does not correspond to executable instructions, then the code analyzer can split the proposed change into code segments such that no code segment contains that portion of text. A code analyzer can be associated a particular aspect of security concerns, which can influence the generated code segments.

At 908, the system provides prompts to one or more LLMs. These prompts can correspond to the set of known security vulnerabilities corresponding to the code context.

At 910, the system supplies assistance data for the set of code segments. The assistance data can include information, such as a known vulnerable coding pattern for the set of code segments, a set of known edge scenarios (e.g., edge cases) representing extreme values within a range of possible values. In some implementations, the system supplies LLMs with one or more few-shot prompting examples based at least in part on the code context. In some implementations, the system uses an LLM to determine that assistance data should be provided. For example, an LLM can process the code context and determine that assistance data, such as details pertaining to a programming language, should be provided. In some implementations, the system supplies assistance data multiple times, or a variable number of times, based on the output of the LLMs. For example, the system can include regular prompts to the LLMs that are used to identify whether the LLMs are producing output with insufficient detail, and supply relevant assistance data.

In some implementations, the system processes one or more natural-language prompts provided by a user to detect security vulnerabilities. This can be in the form of a code policy, and can include other natural-language prompts, such as requests to provide an explanation of a security vulnerability and/or a request to provide information for mitigating a security vulnerability. Furthermore, the prompts used by the LLMs to detect security vulnerabilities can also be natural-language prompts. Any natural-language prompt can be provided by a user and processed as part of detecting a security vulnerability.

At 912, the system determines whether a security vulnerability exists in the proposed change using a set of updated responses from the one or more LLMs after the assistance data has been processed. The system can detect security vulnerabilities that correspond to a particular predetermined aspect of security concerns.

In some implementations, the final output of the system is a security analysis report. The security analysis report can include details of the findings of the analysis by the system, such as whether a security vulnerability has been detected. The security analysis report can also include explanations for any detected security vulnerabilities and/or suggested actions for mitigation. In some implementations, the explanations and suggested actions are included in the security analysis in response to one or more natural-language security prompts entered by a user, such as in a code policy.

Enforcing Deterministic Behavior on Probabilistic LLMs

Large Language Models (LLMs) typically produce non-deterministic outputs due to the probabilistic nature of their generation process. When an LLM generates text, it does not output a response determined solely by the input. Rather, when generating each token (such as a word or punctuation mark), the LLM samples from a probability distribution over possible next tokens. This sampling process introduces an element of randomness, which can lead to different outputs even when given the same input prompt. However, ensuring deterministic outputs from LLMs can be valuable in applications that require consistency and reproducibility. Deterministic outputs can facilitate testing, debugging, and validation of LLM-based systems. They can also enhance user trust by providing consistent responses to the same queries over time.

The randomness introduced by an LLM allows the model to produce varied and creative responses and can prevent repetitive patterns in the output, which help the LLM mimic human-like natural language. Thus, while some LLM models may have parameters (e.g., temperature) which can be set to force the output of an LLM to be deterministic, such an approach may not always be helpful or practical (such as when using a cloud-based LLM service like ChatGPT).

An incremental inquiry chain is an approach that can help achieve more deterministic outputs from LLMs. This method involves breaking down a complex query or task into a series of smaller, more specific questions or prompts. Each step in the chain is designed to elicit a short, specific response from the LLM, with the goal of reducing variability in each output, and thus in the overall output.

The incremental inquiry chain works by guiding the LLM through a structured thought process, similar to how a human approaches a complex problem step-by-step. By asking a series of focused questions, each with a limited range of possible answers, the method constrains the LLM's output at each step. This approach reduces the impact of the inherent randomness in the LLM's generation process, achieving a higher degree of consistency in LLM outputs without requiring modifications to the underlying model or restrictions on its parameters.

As an example, instead of asking an LLM to analyze a recipe for nutritional content in a single prompt, an incremental inquiry chain can first ask about the ingredients used, then about specific nutritional components common in those ingredients, and finally about the presence of those specific nutrients in the given recipe. Each step has a more limited set of possible responses, leading to more consistent overall output.

In some implementations, the incremental inquiry chain incorporates error checking or validation steps. These steps compare the LLM's output at each stage against expected patterns or ranges, and can trigger additional inquiries or steps if the responses are unexpected or inadequate. This iterative process can further reduce the variability of the final output.

Figure 10:
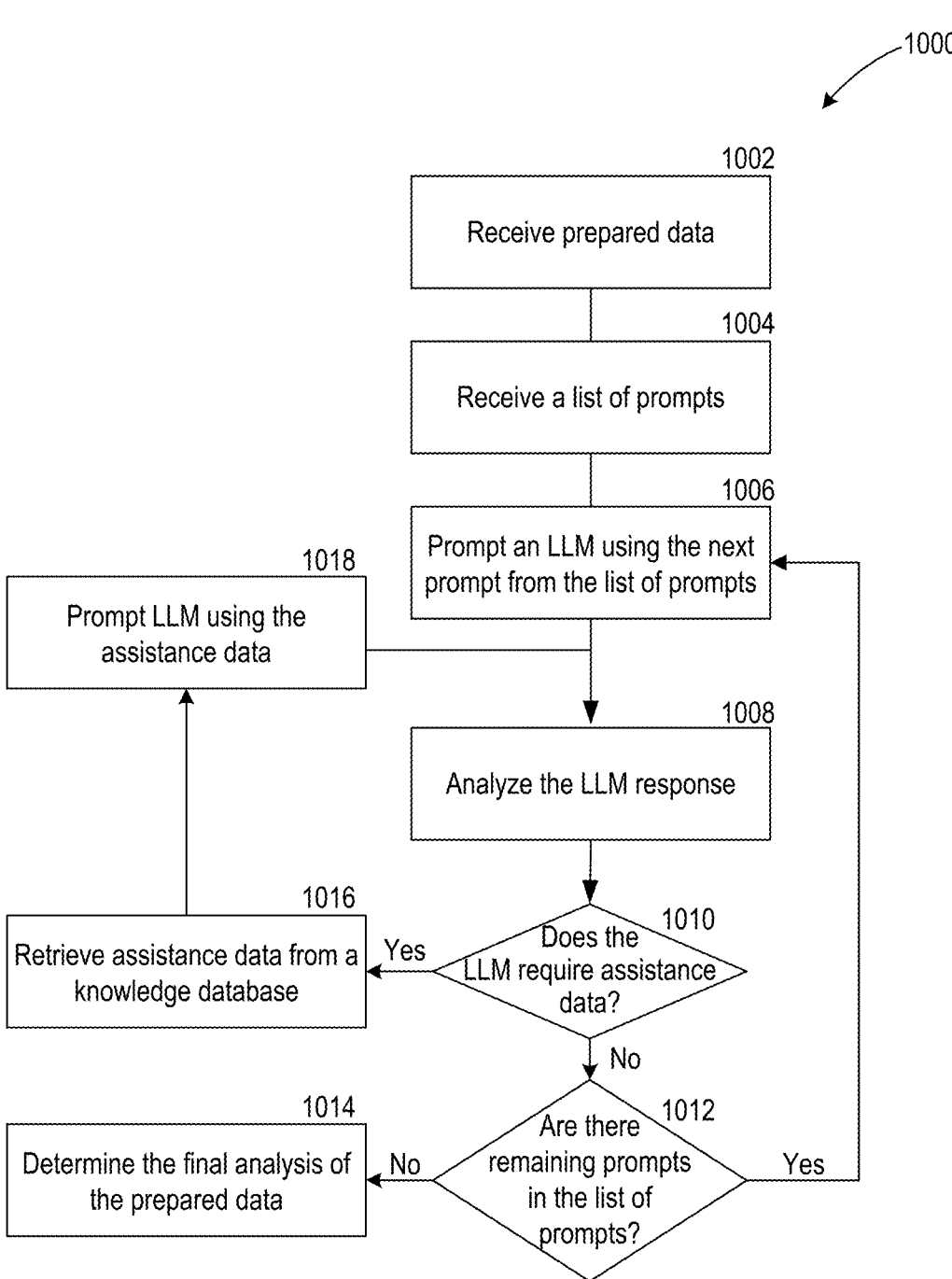
FIG. 10 is a flow diagram illustrating a method of prompting an LLM using a list of prompts to produce a deterministic output corresponding to prepared input data.

FIG. 10 illustrates a flowchart 1000 of a method for generating a deterministic output for the analysis of prepared data using a large language model (LLM) and a list of prompts, such as an incremental inquiry chain. The prepared data can include any data that the system is intended to analyze, such as one or more text documents, images, multimedia files, or any combination thereof. If the prepared data includes data in a format other than text, the LLM can be supplemented by the use of other artificial intelligence and/or machine learning models to process this multimedia data.

At 1002, prepared data is received by the system. This can be retrieved from a database or supplied by a user.

At 1004, the system composes a list of prompts corresponding with a certain analysis that is to be performed on the prepared data. The list of prompts can be retrieved from a database, generated by the system, or chosen from a collection of lists. These prompts are designed to guide the LLMs in analyzing the prepared data, such that the final output of the process is the same when the inputs (e.g., the prepared data and the list of prompts) are the same. For example, each prompt can be designed to incrementally guide the LLM in completing a complex overall analysis. Each prompt can be designed to return a response from the LLM that is in a certain format or within a restricted set of responses. For example, a prompt can be expected to return a Boolean value. This can correspond to a literal "Yes" or "No" output from the LLM, or can more generally correspond to positive or negative outputs from the LLM without requiring a specific verbatim response. The restricted set of responses can include a predetermined set of categories. For example, a prompt can be expected to return a result from the LLM that corresponds to either "high," "average," "low," "cannot be determined," or "assistance data required," with or without requiring a specific verbatim response. The restricted set of responses can correspond to types of information to be returned, such as a name, category, or numerical value.

The list of prompts can be linear or can include branches or loops that are chosen based on the responses of the LLM. In some implementations, the list of prompts includes a series of prompts with multiple possible subseries representing branching paths. Each prompt in the list of prompts can also have associated information, such as an expected response format, conditions for choosing certain branches, or conditions in which assistance data is required. In some implementations, the system receives a directive from a user to perform a certain analysis on the prepared data, and the system retrieves a corresponding list of prompts. In some implementations, the system generates the list of prompts, for example, by splitting an input prompt containing instructions. In some implementations, a specific list of prompts is supplied to the system. For example, the system receives the list of prompts selected from a set of predetermined prompts based on information about the analysis. In some implementations, an input (such as instructions) is separated into a series of prompts or assistance questions having incremental complexities. For example, each assistance question can bring the LLM responses incrementally closer to responding to a complex input, such that the final response is deterministic (e.g., resulting in the same final response when given the same input) and addresses the input.

At 1006, the LLM is prompted using the next prompt from the list of prompts. The input to the LLM can also include the prepared data or a portion of the prepared data. The input can also include the output of an LLM, such as a response from 1012. In some implementations, 1006 is performed multiple times in sequence before any responses are analyzed, and the input to the LLM can include the prepared data or a portion of the prepared data, the next prompt from the list of prompts, one or more previous responses by the LLM, or any combination thereof. In some implementations, the prompt includes relevant data that the LLM needs to perform the analysis or directs the system to retrieve such data and supply it to the LLM.

At 1008, the LLM response is analyzed by the system. This analysis can involve evaluating the relevance, accuracy, and completeness of the LLM's output. In some examples, the system uses an LLM to analyze the response. In some implementations, the most recent prompt has associated information that describes the expected format of the response. For example, a prompt can be expected to result in a Boolean response or be expected to result in an output that comes from a list of allowed outputs. The system can then use this data to determine if the response conforms to the expected format. In some implementations, the system retrieves or generates a prompt that is intended to correct a response that does not conform to an expected format. Such a prompt can be designed to rephrase a response, or to generate a different response that conforms to the restricted set of responses. In some implementations, the analysis is used to determine the next prompt from the list of prompts, such as when the list of prompts has a branching structure with multiple possible subsequent prompts.

At 1010, the system determines if the LLM response is adequate. If the response is not adequate, then at 1016, assistance data is retrieved from a knowledge database to assist the LLM in generating an adequate response. The selection of assistance data can be based on the prepared data, the current prompt, information associated with the current prompt, one or more previous responses by the LLM, or any combination thereof. In some implementations, the selection of assistance data is determined by an LLM. This assistance data can include instructions, few-shot prompts, information pertaining to the prepared data, or any combination thereof.

At 1018, the LLM is prompted again using the assistance data. The input to the LLM can also include the prepared data or a portion of the prepared data, a prompt from the list of prompts, one or more previous responses, or any combination thereof. The prompt from the list of prompts that is used can be determined in part by information associated with the most recent prompt, and can be the most recent prompt, a subsequent prompt, or an alternative prompt that is used in response to assistance data being required. Prompting the LLM at 1018 can include submitting multiple prompts to the LLM, based on the assistance data. For example, the assistance data can direct the system to prompt the LLM and use the resulting response to retrieve more assistance data and/or another prompt from the list of prompts. After 1018, the process returns to 1008 to analyze the new LLM response.

If at 1010 the LLM response is determined to be adequate, then at 1012 the system determines if there are remaining prompts in the list of prompts. If there are remaining prompts, then at 1006 the next prompt is submitted to the LLM. Determining which prompt in the list of prompts is the next prompt can be based on the analysis at 1008 (e.g., in the case of a branching structure), and can be dependent on the LLM response, the prepared data, information associated with the most recent prompt, and/or whether assistance data was required at 1010. In some implementations, the system can update the list of prompts based on the response of the LLM and the analysis at 1010. This can include adding or removing prompts, modifying prompts (such as incorporating portions of the prepared data or any user input), or choosing one of multiple branching paths of prompts. In some implementations, the system, at 1012, determines if there are no remaining prompts in the list of prompts and/or if there are no prompts to be generated or added to the list. In some implementations, the list of prompts is modified to incorporate assistance data.

If there are no remaining prompts, then at 1014, final analysis of the prepared data is determined. In some implementations, the final analysis is the last output of the LLM at 1012. In some implementations, the final analysis is generated based on multiple responses generated by the LLM. The final analysis represents the deterministic output generated through the iterative prompting and assistance process.

In some implementations of the above process, multiple LLMs are used in place of a single LLM. In such implementations, prompting an LLM and receiving a response can involve processing the prompt and/or other inputs by one or more of the multiple LLMs, the output of which can be further processed by a second LLM of the multiple LLMs, and/or subsequent selections of LLM from the multiple LLMs, eventually generating in a single result. In some embodiments, the same LLM can be selected and used multiple times. For example, output from an LLM can be supplied to the same LLM for further processing.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (e.g., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (or "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (e.g., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

FIG. 11 is a block diagram 1100 of an example transformer 1112. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 1112 includes an encoder 1108 (which can comprise one or more encoder layers/blocks connected in series) and a decoder 1110 (which can comprise one or more decoder layers/blocks connected in series). Generally, the encoder 1108 and the decoder 1110 each include a plurality of neural network layers, at least one of which can be a self-attention layer. The parameters of the neural network layers can be referred to as the parameters of the language model.

The transformer 1112 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 1112 is trained to perform certain functions on other input formats than natural language input. For example, the input can include objects, images, audio content, or video content, or a combination thereof.

The transformer 1112 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 11 illustrates an example of how the transformer 1112 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 11, a short sequence of tokens 1102 corresponding to the input text is illustrated as input to the transformer 1112. Tokenization of the text sequence into the tokens 1102 can be performed by some pre-processing tokenization module such as, for example, a byte-pair encoding tokenizer (the "pre" referring to the tokenization occurring prior to the processing of the tokenized input by the LLM), which is not shown in FIG. 11 for simplicity. In general, the token sequence that is inputted to the transformer 1112 can be of any length up to a maximum length defined based on the dimensions of the transformer 1112. Each token 1102 in the token sequence is converted into an embedding vector 1106 (also referred to simply as an embedding 1106). An embedding 1106 is a learned numerical representation (such as, for example, a vector) of a token that captures some semantic meaning of the text segment represented by the token 1102. The embedding 1106 represents the text segment corresponding to the token 1102 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 1106 corresponding to the "write" token is closer to another embedding corresponding to the "jot down" token in the vector space as compared to the distance between the embedding 1106 corresponding to the "write" token and another embedding corresponding to the "summary" token.

The vector space can be defined by the dimensions and values of the embedding vectors. Various techniques can be used to convert a token 1102 to an embedding 1106. For example, another trained ML model can be used to convert the token 1102 into an embedding 1106. In particular, another trained ML model can be used to convert the token 1102 into an embedding 1106 in a way that encodes additional information into the embedding 1106 (e.g., a trained ML model can encode positional information about the position of the token 1102 in the text sequence into the embedding 1106). In some examples, the numerical value of the token 1102 can be used to look up the corresponding embedding in an embedding matrix 1104 (which can be learned during training of the transformer 1112).

The generated embeddings 1106 are input into the encoder 1108. The encoder 1108 serves to encode the embeddings 1106 into feature vectors 1114 that represent the latent features of the embeddings 1106. The encoder 1108 can encode positional information (i.e., information about the sequence of the input) in the feature vectors 1114. The feature vectors 1114 can have very high dimensionality (e.g., on the order of thousands or tens of thousands), with each element in a feature vector 1114 corresponding to a respective feature. The numerical weight of each element in a feature vector 1114 represents the importance of the corresponding feature. The space of all possible feature vectors 1114 that can be generated by the encoder 1108 can be referred to as the latent space or feature space.

Conceptually, the decoder 1110 is designed to map the features represented by the feature vectors 1114 into meaningful output, which can depend on the task that was assigned to the transformer 1112. For example, if the transformer 1112 is used for a translation task, the decoder 1110 can map the feature vectors 1114 into text output in a target language different from the language of the original tokens 1102. Generally, in a generative language model, the decoder 1110 serves to decode the feature vectors 1114 into a sequence of tokens. The decoder 1110 can generate output tokens 1116 one by one. Each output token 1116 can be fed back as input to the decoder 1110 in order to generate the next output token 1116. By feeding back the generated output and applying self-attention, the decoder 1110 is able to generate a sequence of output tokens 1116 that has sequential meaning (e.g., the resulting output text sequence is understandable as a sentence and obeys grammatical rules). The decoder 1110 can generate output tokens 1116 until a special [EOT] token (indicating the end of the text) is generated. The resulting sequence of output tokens 1116 can then be converted to a text sequence in post-processing. For example, each output token 1116 can be an integer number that corresponds to a vocabulary index. By looking up the text segment using the vocabulary index, the text segment corresponding to each output token 1116 can be retrieved, the text segments can be concatenated together, and the final output text sequence can be obtained.

In some examples, the input provided to the transformer 1112 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 12:
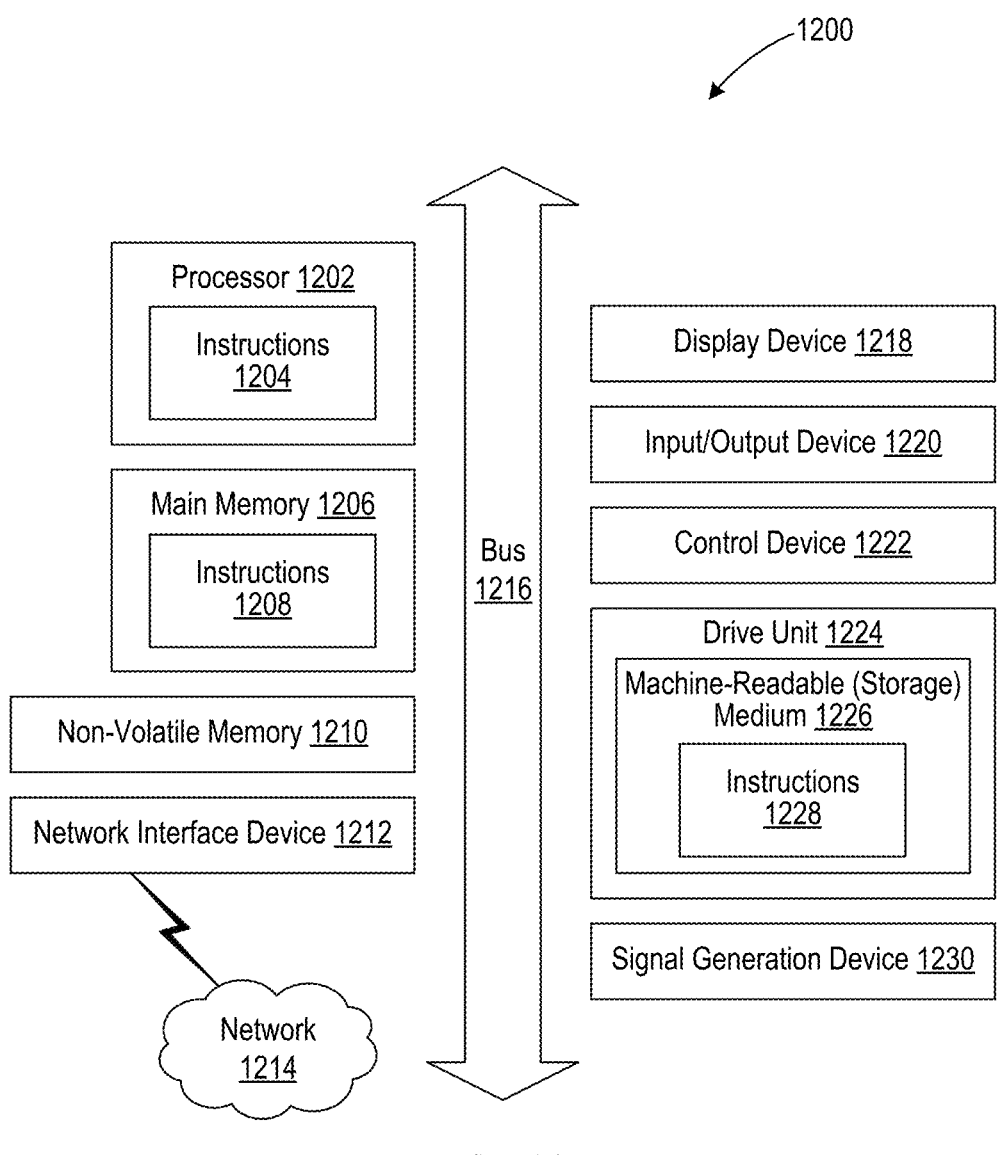
FIG. 12 is a block diagram that illustrates components of a computing device.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks. Where appropriate, one or more computer systems 1200 can perform operations in real time, in near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/ or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim uses the words "means for." However, the use of the term "for" in any other context is not intended to invoke a similar interpretation. The applicant reserves the right to pursue such additional claim forms either in this application or in a continuing application.

What is claimed is:

1. At least one non-transitory, computer-readable storage medium comprising instructions recorded thereon, wherein the instructions, when executed by at least one data processor of a system, cause the system to:
    receive a proposed change to a codebase,
        wherein the codebase comprises a collection of files including texts written in one or more programming languages,
        wherein the proposed change comprises one or more changes to one or more files in the codebase;
    determine a code context for the proposed change based on at least a file type of the one or more files or a programming language used in the one or more files,
        wherein the code context corresponds to an application type of the codebase, and
        wherein the application type is associated with a set of known security vulnerabilities;
    split, by a plurality of code analyzers and based on the code context, the proposed change into code segments,
        wherein each of the plurality of code analyzers is configured to analyze a specific aspect of security concerns, and
        wherein each of the plurality of code analyzers is configured to split the proposed change into a corresponding set of code segments according to a corresponding aspect of security concerns; and detect whether a security vulnerability exists in the proposed change by using the plurality of code analyzers to analyze corresponding sets of code segments in parallel.

2. The at least one non-transitory, computer-readable storage medium of claim 1, wherein a first code segment contains text from multiple changed files, and wherein the first code segment and a second code segment contain text from a single changed file.

3. The at least one non-transitory, computer-readable storage medium of claim 1, further comprising instructions to:
    determine a code context for the proposed change based on at least a dependency used by the one or more files in the codebase,
        wherein a dependency comprises functions used by the one or more files,
        wherein one or more functions of the dependency are associated with a known security vulnerability; and
    detect, by a code analyzer, that the known security vulnerability is present in a set of code segments.

4. The at least one non-transitory, computer-readable storage medium of claim 1, wherein splitting the proposed change based on code context further comprises:
    determine, using a code analyzer, that a changed file has a name or a path that corresponds to a known security vulnerability; and
    include text from the changed file in a code segment.

5. The at least one non-transitory, computer-readable storage medium of claim 1, wherein splitting the proposed change based on the code context comprises:
    determine, based on the code context of a file, that a portion of text in the file does not correspond to executable instructions; and
    split, by the plurality of code analyzers, the proposed change based on the code context,
        wherein the code segments exclude the portion of text.

6. The at least one non-transitory, computer-readable storage medium of claim 1, wherein using code analyzers to analyze a corresponding set of code segments comprises:
    identifying assistance data based on the code context; and
    processing the assistance data and one or more prompts using a large language model.

7. The at least one non-transitory, computer-readable storage medium of claim 1, wherein at least one of the plurality of code analyzers is configured to analyze multiple aspects of security concerns.

8. The at least one non-transitory, computer-readable storage medium of claim 1, further comprising instructions to:
    receive, from a user, a natural-language security question,
        wherein the natural-language security question is associated with a particular security vulnerability; and
    detect, at least in part by processing the natural-language security question using a code analyzer, that the particular security vulnerability exists in the proposed change.

9. The at least one non-transitory, computer-readable storage medium of claim 1, further comprising instructions to:
    anonymize a code segment,
        wherein anonymizing a code segment comprises removing data or metadata that identifies a source of the code segment; and
    store the anonymized code segment in a repository.

10. The at least one non-transitory, computer-readable storage medium of claim 1, further comprising instructions to:

produce a first summary describing results of the detection;

receive a second summary describing results of a second detection of a security vulnerability in a second set of proposed changes from a second codebase; and generate, based on the first and second summaries, a summary describing changes in the first and second codebases.

11. A system comprising:

at least one processor; and at least one memory storing instructions that, when executed by the at least one processor, cause the system to:

identify a first set of security analysis reports, wherein each security analysis report corresponds to a security analysis performed on a first proposed change for a first codebase, wherein the first proposed change comprises one or more changes to one or more files in the first codebase, and wherein each security analysis report comprises output from each of a set of code analyzers used to detect potential security vulnerabilities in the first proposed change;

generate, based on the first set of security analysis reports, a first change request security summary;

generate, based on a second set of security analysis reports corresponding to a second security analysis performed on a second proposed change for a second codebase, a second change request security summary; and determine a code context for at least one of the first or second proposed changes based on at least a file type of the one or more files or a programming language used in the one or more files, wherein the code context includes an indication of an application type of the codebase, wherein the application type is associated with a set of known security vulnerabilities; and wherein the set of code analyzers analyze at least one of the first or second proposed changes, using the code context;

generate, from the first and second change request security summaries, an awareness digest;

wherein the awareness digest identifies security vulnerabilities, detected in both the first and second proposed changes, associated with a particular security concern.

12. The system of claim 11, wherein generating the first change request security summary comprises processing the first set of security analysis reports using a large language model (LLM).

13. The system of claim 11, further comprising:

generating a second awareness digest from the first and second proposed changes, wherein the second awareness digest identifies security vulnerabilities, detected in both the first and second proposed changes, associated with a second security concern.

14. The system of claim 11, wherein the second codebase is the first codebase.

15. A computer-implemented method, comprising:

receiving a proposed change for a codebase, wherein the codebase comprises a collection of files including texts written in one or more programming languages, wherein the proposed change comprises one or more changes to one or more files in the codebase;

determining an application type of the codebase, wherein the application type is associated with a set of known security vulnerabilities, and wherein the application type is determined based on at least one of: a file type of the one or more files in the codebase, a programming language used in the one or more files in the codebase, a code dependency used by the one or more files in the codebase, or a user who made one or more changes included in the proposed change to the codebase;

determining a code context for the proposed change, wherein the code context includes the application type associated with the set of known security vulnerabilities;

generating, by a plurality of code analyzers, sets of code segments, wherein each code segment contains text from the proposed change, wherein each of the plurality of code analyzers is configured to generate a corresponding set of code segments; and detecting a security vulnerability in the proposed change by using the plurality of code analyzers to analyze corresponding sets of code segments in parallel.

16. The computer-implemented method of claim 15, wherein each of the plurality of code analyzers are configured to:

identify, based on the code context, assistance data; and process, using a large language model, the assistance data and a corresponding set of code segments.

17. The computer-implemented method of claim 15, further comprising:

identifying a natural-language security question, wherein the natural-language security question is associated with a particular security vulnerability; and detecting, at least in part by processing the natural-language security question using a code analyzer, a security vulnerability in the proposed change.

18. The computer-implemented method of claim 15, further comprising:

detecting a second security vulnerability in a second proposed change to a second codebase; and generating a summary based on the security vulnerability detected in the codebase and on the second security vulnerability detected in the second codebase.

19. The computer-implemented method of claim 15, further comprising:

determining, based at least in part on the code context, that a portion of text in the proposed change corresponds to executable instructions; and including the portion of text in at least one code segment.

20. At least one non-transitory, computer-readable storage medium comprising instructions recorded thereon, wherein the instructions, when executed by at least one data processor of a system, cause the system to:

receive a proposed change for a codebase comprising a collection of files including text written in one or more programming languages, wherein the proposed change comprises one or more changes to one or more files in the codebase;

receive a code context for the proposed change, wherein a code context is determined based on at least a file type of the one or more files or a programming language used in the one or more files, wherein the code context corresponds to an application type of the codebase that is associated with a set of known security vulnerabilities;

split the proposed change into a set of code segments according to the set of known security vulnerabilities that corresponds to the code context; and providing, to one or more Large Language Models (LLMs), one or more prompts corresponding to the set of known security vulnerabilities;

supplying, based on a set of initial responses from the one or more LLMs, assistance data for the set of code segments, wherein the assistance data comprises at least one of: a known vulnerable coding pattern for the set of code segments, or a set of known edge scenarios representing extreme values within a range of possible values; and determining whether a security vulnerability exists based on a set of updated responses from the one or more LLMs.

21. The at least one non-transitory computer-readable storage medium of claim 20, wherein receiving the code context comprises generating the code context by processing the proposed change using an LLM.

22. The at least one non-transitory computer-readable storage medium of claim 20, wherein determining whether a security vulnerability exists in the proposed change further comprises:

supplying the one or more LLMs with one or more one-shot or few-shot prompting examples, wherein the one or more examples are determined based at least in part on the code context.

\* \* \* \* \*